United States Patent
Choi

(10) Patent No.: US 11,158,323 B2
(45) Date of Patent: Oct. 26, 2021

(54) ELECTRONIC APPARATUS, ELECTRONIC SYSTEM AND CONTROL METHOD THEREOF

(71) Applicant: SAMSUNG ELECTRONICS CO., LTD., Suwon-si (KR)

(72) Inventor: Chanhee Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 16/214,552

(22) Filed: Dec. 10, 2018

(65) Prior Publication Data

US 2019/0189127 A1 Jun. 20, 2019

(30) Foreign Application Priority Data

Dec. 18, 2017 (KR) .................. 10-2017-0174050

(51) Int. Cl.
| | | |
|---|---|---|
| *G10L 15/30* | (2013.01) | |
| *G10L 15/08* | (2006.01) | |
| *G10L 15/22* | (2006.01) | |
| *H04L 29/06* | (2006.01) | |
| *G06F 3/16* | (2006.01) | |

(Continued)

(52) U.S. Cl.
CPC .............. *G10L 15/30* (2013.01); *G06F 3/167* (2013.01); *G06F 21/30* (2013.01); *G10L 15/08* (2013.01); *G10L 15/22* (2013.01); *G10L 15/24* (2013.01); *G10L 15/26* (2013.01); *H04L 63/0838* (2013.01); *H04L 63/0861* (2013.01); *G10L 17/22* (2013.01)

(58) Field of Classification Search
None
See application file for complete search history.

(56) References Cited

U.S. PATENT DOCUMENTS

| 9,336,779 B1 * | 5/2016 | Patel ........................ G06F 21/36 |
| 2015/0142959 A1 | 5/2015 | Honda et al. |

(Continued)

FOREIGN PATENT DOCUMENTS

| JP | 2002-342288 A | 11/2002 |
| JP | 2002342288 A * | 11/2002 |

(Continued)

OTHER PUBLICATIONS

Sakurazawa Tadashi, Authentication Device, Authentication System, Authentication Method, Authentication Program and Recording Mediu, Nov. 29, 2002, Machine Translation (Year: 2002).*

(Continued)

*Primary Examiner* — Nafiz E Hoque
(74) *Attorney, Agent, or Firm* — Nixon & Vanderhye P.C.

(57) ABSTRACT

An electronic apparatus is disclosed. The electronic apparatus includes a communicator; and a processor configured to select a plurality of different words respectively corresponding to a plurality of characters based on occurrence of a password input event, and to transmit the plurality of selected words to a terminal device through the communicator, and based on a user voice including at least one of the plurality of selected words being received, perform password authentication based on a character corresponding to the at least one of the plurality of selected words.

18 Claims, 14 Drawing Sheets

(51) Int. Cl.
  *G10L 15/24* (2013.01)
  *G06F 21/30* (2013.01)
  *G10L 15/26* (2006.01)
  *G10L 17/22* (2013.01)

(56) References Cited

U.S. PATENT DOCUMENTS

2017/0124311 A1  5/2017  Li et al.
2017/0244701 A1* 8/2017  Su .................... G06F 3/04886
2017/0263249 A1  9/2017  Akbacak et al.

FOREIGN PATENT DOCUMENTS

JP  2005-174023 A   6/2005
JP  2009-093256 A   4/2009
JP  2017-142651     8/2017
KR  10-1424962      8/2014
KR  10-2015-0146061 12/2015

OTHER PUBLICATIONS

International Search Report and Written Opinion of the International Searching Authority dated Mar. 12, 2019, issued in International Application No. PCT/KR2018/015387.
Extended European Search Report dated Jul. 20, 2020 for European Application No. 18890533.5.
European Examination Report dated Mar. 12, 2021 for EP Application No. 18890533.5.

* cited by examiner

FIG. 3B

| User | ID | Password | terminal | etc |
|---|---|---|---|---|
| A | Mike | "abc" | smartphone #1 | image |
| B | bnc35 | "abc1" | PC #3154 | voice |
| ⋮ | ⋮ | ⋮ | ⋮ | ⋮ |

# ELECTRONIC APPARATUS, ELECTRONIC SYSTEM AND CONTROL METHOD THEREOF

CROSS-REFERENCE TO RELATED APPLICATION

This application is based on and claims priority under 35 U.S.C. § 119 to Korean Patent Application No. 10-2017-0174050, filed on Dec. 18, 2017, in the Korean Intellectual Property Office, the disclosure of which is incorporated by reference herein in its entirety.

BACKGROUND

1. Field

The disclosure relates generally to an electronic apparatus and a controlling method thereof, and, for example, to an electronic apparatus for performing password authentication and a controlling method thereof.

2. Description of Related Art

When a user tries to log in to a specific server or application, a password for user authentication needs to be input. Particularly, when a password is input through voice recognition, there may be a method of uttering alphabets, digits, and special symbols of a previously set password in a preset form, or uttering a specific sentence registered in advance. In addition, biometrics such as speaker recognition, face recognition, and fingerprint recognition may be used to enhance security.

However, there is a concern that if a user directly utters a password, the password may likely be leaked, and alphabets, digits, and special symbols may lead to errors of recognition due to the various types of utterances and short utterance length.

In the case of using the sentence set by a user as a password, other than a common password, the password may likely be leaked when uttered, and there may occur a problem of false recognition.

In addition, in the use of a voice recognition device, the recognition device which stores the contents of utterance in a server may be involved in the privacy problem when the content of password is stored as it is. Therefore, there is limitation on using an additional embedded recognition device.

Accordingly, an authentication method is needed to prevent and/or reduce the security problem and the false recognition although a password is input through voice recognition.

SUMMARY

An example aspect of the example embodiments relates to providing an electronic apparatus for improving a security function during a password authentication process, an electronic system, and a controlling method thereof.

According to an example embodiment, an electronic apparatus is provided, the electronic apparatus including: a communicator, and a processor configured to, based on occurrence of a password input event, select a plurality of different words respectively corresponding to a plurality of characters, and to cause the electronic apparatus to transmit the plurality of selected words to a terminal device through the communicator, and perform password authentication based on a character corresponding to the at least one of the plurality of selected words based on a user voice including at least one of the plurality of selected words being received.

The electronic apparatus may further include a storage configured to store password information including at least one character, wherein the processor is further configured to cause the electronic apparatus to perform the password authentication based on the character corresponding to the at least one word matching the password information.

The processor may be further configured to cause the electronic apparatus to, based on a user voice including a first word and a second word among the plurality of words being received, combine a first character corresponding to the first word with a second character corresponding to the second word based on a reception order of the first word and the second word, and to perform the password authentication based on a string of the combined first and second characters matching the password information.

The processor may be further configured to cause the electronic apparatus to perform the password authentication by combining the first character with the second character based on a difference between a reception time of the first word and a reception time of the second word being within a predetermined period of time, and to perform the password authentication with each of the first character and the second character based on the difference between the reception time of the first word and the reception time of the second word exceeding the predetermined period of time The electronic apparatus may further include a display, wherein the processor is further configured to cause the electronic apparatus to display a UI to which a password is input based on the password input event through the display, and to input at least one word corresponding to the received user voice to the UI based on the user voice being input.

The processor may be further configured to cause the electronic apparatus to, based on occurrence of a predetermined event, identify (determine) whether the character corresponding to the at least one word input to the UI matches the password information, and perform the password authentication based on the character corresponding to the at least one word matching the password information.

The processor may be further configured to cause the electronic apparatus to identify (determine) a character type necessary for the password authentication based on the password information, and to select a plurality of different words respectively corresponding to a plurality of characters in the character type.

The plurality of characters may include at least one of: alphabet, digit, symbol, Korean, and Chinese, and wherein the processor is further configured to cause the electronic apparatus to match the plurality of characters with the plurality of words and to transmit the matched plurality of characters and words to the terminal device.

The processor may be further configured to cause the electronic apparatus to identify a user based on at least one of: face recognition of the user, input of information on the user, a voice of the user, and a use state of the electronic apparatus, and to identify the terminal device based on the identified user.

The electronic apparatus may further include a display, wherein the processor is further configured to cause the electronic apparatus to display a UI which requests confirmation of the terminal device through the display based on the user being identified, and to transmit the plurality of words to the terminal device based on a confirmation input of the user being received.

The user voice may be received through a microphone provided in the electronic apparatus, or received from an external device.

According to an example embodiment, an electronic system is provided, the electronic system including an electronic apparatus configured to, based on occurrence of a password input event, select a plurality of different words respectively corresponding to a plurality of characters, and to transmit the plurality of selected words to a terminal device, and a terminal device configured to, based on the plurality of selected words being received from the electronic apparatus, display the plurality of received words, wherein the electronic apparatus, based on a user voice including at least one of the plurality of received words being received, performs password authentication based on a character corresponding to the at least one word.

According to an example embodiment, a method for controlling an electronic apparatus is provided, the method including selecting a plurality of different words respectively corresponding to a plurality of characters based on occurrence of a password input event, transmitting the plurality of selected words to a terminal device, and based on a user voice including at least one of the plurality of selected words being received, performing password authentication based on a character corresponding to the at least one word.

The performing of the password authentication may include performing the password authentication based on the character corresponding to the at least one word matching pre-stored password information including at least one character.

The performing of the password authentication may include, based on a user voice including a first word and a second word of the plurality of words being received, combining a first character corresponding to the first word with a second character corresponding to the second word based on a reception order of the first word and the second word, and performing the password authentication based on a string of the combined first and second characters matching the password information.

The performing of the password authentication may include performing the password authentication by combining the first character with the second character based on a difference between a reception time of the first word and a reception time of the second word being within a predetermined period of time, and performing the password authentication with each of the first character and the second character based on the difference between the reception time of the first word and the reception time of the second word exceeding the predetermined period of time.

The method may further include displaying a UI to which a password is input based on the password input event, and based on the user voice being received, inputting at least one word corresponding to the received user voice to the UI.

The performing of the password authentication may include identifying whether a character corresponding to the at least one word input to the UI matches the password information based on occurrence of a predetermined event, and performing the password authentication based on the character corresponding to the at least one word matching the password information.

The selecting may include identifying a character type necessary for the password authentication based on the password information, and selecting a plurality of different words respectively corresponding to a plurality of characters in the character type.

The plurality of characters may include at least one of: alphabet, digit, symbol, Korean, and Chinese, and wherein the transmitting comprises matching the plurality of characters with the plurality of words and transmitting the matched plurality of characters and words to the terminal device.

According to the above-described various example embodiments, an electronic apparatus may improve usability by performing password authentication through a user voice and provide the improved security function by preventing and/or reducing leakage of a password.

BRIEF DESCRIPTION OF THE DRAWINGS

The above and/or other aspects, features and attendant advantages of various embodiment of the present disclosure will be more apparent and readily appreciated from the following detailed description, taken in conjunction with the accompanying drawings, in which like reference numerals refer to like elements, and wherein:

FIGS. 3A, 3B and 3C are diagrams illustrating an example method for transmitting a plurality of words to a terminal device according to an example embodiment;

DETAILED DESCRIPTION

Figure 1:
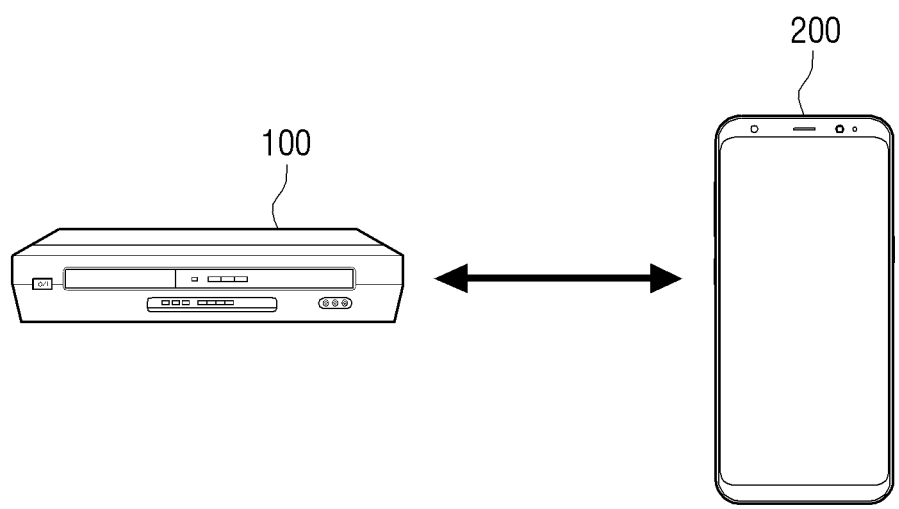
FIG. 1 is a diagram illustrating an example configuration of an electronic system according to an example embodiment.

Various example embodiments of the present disclosure may be diversely modified. Accordingly, specific example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not be described in detail where they would obscure the disclosure with unnecessary detail.

Hereinafter, various example embodiments of the present disclosure will be described in greater detail with reference to the accompanying drawings.

FIG. 1 is a diagram illustrating an example of configuration of an electronic system 1000 according to an example embodiment. Referring to FIG. 1, the electronic system 1000 may include an electronic apparatus 100 and a terminal device 200.

The electronic apparatus 100 may, for example, and without limitation, be a set-top box (STB), a desktop PC, a notebook, a smart phone, a tablet PC, a server, a TV, and the like, which performs password authentication. However, the present disclosure is not limited thereto, and the electronic apparatus 100 could be any type of apparatus so long as it requires password authentication.

The electronic apparatus 100 may perform communication with the terminal device 200. For example, the electronic apparatus 100 may transmit a plurality of words to the terminal device 200.

The electronic apparatus 100 may store information on the terminal device 200. However, the present disclosure is not limited thereto. When the electronic apparatus 100 does not store the information on the terminal device 200, the electronic apparatus 100 may request a user to input the information on the terminal device 200.

The electronic apparatus 100 may receive a user voice. For example, the electronic apparatus 100 may include a microphone, and directly receive a user voice. The electronic apparatus 100 may receive a user voice input through the terminal device 200 from the terminal device 200. The electronic apparatus 100 may receive a user voice input via an additional device such as a remote control device (not shown) from the device.

The remote control device may be configured to control the electronic apparatus 100. However, the present disclosure is not limited thereto, and the remote control device may be a device in which an application for controlling the electronic apparatus 100 is installed in a device such as a smartphone.

The electronic apparatus 100 may include an IR receiver, and receive a control signal from the remote control device through the IR receiver. However, the present disclosure is not limited thereto. The electronic apparatus 100 may receive the control signal from the remote control device through various means, such as, for example, and without limitation, Bluetooth, WiFi, etc. However, any type of communication standard could be used as long as it can receive a control signal from a remote control device.

The remote control device may further include a microphone for receiving a user voice and a communicator including various communication circuitry for transmitting the received user voice to the electronic apparatus 100.

The electronic apparatus 100 may recognize at least one of a plurality of words from the user voice, and perform password authentication based on the recognized word. The electronic apparatus 100 may convert a user voice into text and recognize at least one word from the text. The electronic apparatus 100 may transmit a user voice to an external server (not shown), receive the text corresponding to the user voice from the external server, and recognize the plurality of words. The method for performing password authentication through the recognized word will be described in greater detail below.

The terminal device 200 may be a device for receiving a plurality of words from the electronic apparatus 100 for displaying, and may, for example, and without limitation, be a user's smartphone, tablet PC, desktop PC, notebook computer, or the like. However, the present disclosure is not limited thereto, and the terminal device 200 could be any type of device so long as it includes a display.

The terminal device 200 may include a microphone for receiving a user voice. In this case, the terminal device 200 may transmit the received user voice to the electronic apparatus 100.

While, it is described, by way of non-limiting example, that the terminal device 200 is owned by a user, but the present disclosure is not limited thereto. For example, the terminal device 200 may be a device registered by the electronic apparatus 100, but may not be owned by the user.

As described above, the operations of the electronic apparatus 100 and the terminal device 200 included in the electronic system 1000 have been briefly described. Hereinafter, a method for password authentication will be described in greater detail based on the operation of the electronic apparatus 100.

Figure 2A:
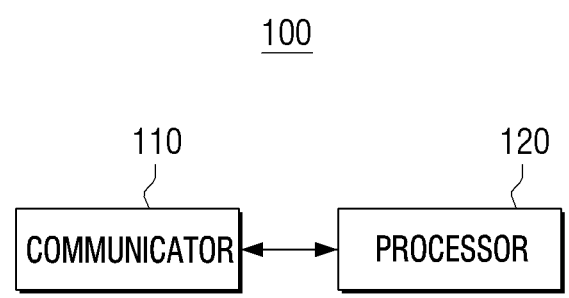
FIG. 2A is a block diagram illustrating an example configuration of an electronic system according to an example embodiment.

FIG. 2A is a block diagram illustrating an example configuration of an electronic apparatus 100 according to an example embodiment.

Referring to FIG. 2A, an electronic apparatus 100 may include a communicator (e.g., including communication circuitry) 110 and a processor (e.g., including processing circuitry) 120.

The communicator 110 may include various communication circuitry and be configured to perform communication with the terminal device 200. For example, the communicator 110 may include various communication circuitry and support various communication protocols such as, for example, and without limitation, BlueTooth (BT), Bluetooth Low Energy (BLE), Wireless Fidelity (WI-FI) and Zigbee. However, the present disclosure is not limited thereto, and any type of communication protocol may be used so long as wireless communication with the terminal device 200 is possible.

The communicator 110 may include a communication interface including communication circuitry capable of performing wired communication with the terminal device 200. For example, the communicator 110 may include a communication interface including circuitry such as, for example, and without limitation, HDMI, MHL, USB, RGB, D-SUB, DVI, or the like.

The electronic apparatus 100 may be connected to an external display device to transmit a UI for password authentication to the external display device. In this example, the electronic apparatus 100 may be connected to the external display device through an interface such as, for example, and without limitation, HDMI, DP, thunderbolt, USB, RGB, D-SUB, DVI, etc., and the communicator 110 may include all the wired communication interfaces. The wired communication interface may include not only a protocol which performs video output and audio output through a single port, but also a protocol which performs video output and audio output through two ports.

However, the present disclosure is not limited thereto. Any type of wired communication interface can be used so long as at least one of video output and audio output can be performed according to the protocol.

The communicator 110 may include circuitry including interfaces of all communication standards capable of performing wired communication with the external display device or the terminal device 200 in addition to the wired communication interface as described above.

The processor 120 may include various processing circuitry and control the overall operation of the electronic apparatus 100.

According to an embodiment, the processor 120 may include various processing circuitry and be implemented as, for example, and without limitation, a digital signal processor (DSP), a microprocessor, a time controller (TCON), or the like, but is not limited thereto, and may include, for example, and without limitation, one or more of a central processing unit (CPU), a micro controller unit (MCU), a micro processing unit (MPU), a controller, an application processor (AP), a communication processor (CP), an ARM processor, and the like, or may be referred to by the corresponding terms. The processor 120 may be implemented as a system on chip (SoC), a large scale integration (LSI) with a built-in processing algorithm, or a Field Programmable Gate Array (FPGA).

The processor 120, based on occurrence of a password input event, may select a plurality of different words respectively corresponding to a plurality of characters. For example, and without limitation, the processor 120, based on occurrence of a password input event, may select dove, guide, lady, girl, boy, go, soft, code, suit and bird, respectively corresponding to characters of 0 to 9. The processor 120 may select a plurality of random different words from the word pool stored in the electronic apparatus 100.

The word pool may include a plurality of Korean words as well as a plurality of English words. However, the present disclosure is not limited to this, and any word could be used so long as it is a word belongs to the language amenable to voice recognition.

The processor 120 may select a plurality of words from the word pool corresponding to at least two languages as well as one language of a plurality of languages. For example, the processor 120, based on occurrence of a password input event, may select dove, guide, lady, girl, school, go, soft, electric, suit and bird respectively corresponding to characters of 0 to 9.

The password input event may vary and include events such as, for example, and without limitation, logging in to a website, accessing an external server, etc. and any case could be possible if it requires password input.

The processor 120 may transit the plurality of selected words to the terminal device 200 through the communicator 110. The processor 120 may further transmit a control command so that the plurality of transmitted words may be displayed by the terminal device 200.

The processor 120 may transmit a plurality of words in order. For example, when dove, guide, lady, girl, boy, go, soft, code, suit and bird respectively corresponding to characters of 0 to 9 are selected, the processor 120 may transmit the selected words in order. The terminal device 200 may display the plurality of words in the order in which the words are transmitted.

The processor 120 may assign an identifier to each word based on the order and transmit the word to the terminal device 200. The terminal device 200 may display a plurality of words in order based on the identifiers.

The processor 120 may match characters with respective words and transmit the characters to the terminal device 200. The terminal device 200 may display the plurality of characters matched with the plurality of words, respectively.

As described above, by way of example, the plurality of characters are 0 to 9. The plurality of characters may include at least one of alphabet, digit, symbol, and Korean, etc. In this case, the processor 120 may match the plurality of characters with the plurality of words and transmit the matched characters and words to the terminal device 200. The terminal device 200 may display the plurality of characters matched with the plurality of words, respectively.

The electronic apparatus 100 may further include a storage in which password information including at least one character is stored. For example, when a user sets "abc" as a password, the processor 120 may store the password "abc" together with user information in the storage. The user information may refer to a user name, but is not limited thereto. For example, the user information may include identification (ID), user face image, user voice, etc. which can identify a user.

The processor 120 may identify the character type necessary for password authentication based on password information, and select a plurality of different words respectively corresponding to a plurality of characters in the character type. For example, when the password is "abc", the processor 120 may select a plurality of different words corresponding to all alphabets. When the password is "abc123", the processor 120 may select different words corresponding to alphabets and digits as a whole.

The character type may be alphabet, digit, symbol, Korean, Chinese, etc. However, the present disclosure is not limited thereto, but any character type could be used if used as a password.

The processor 120 may identity a user based on at least one of user face recognition, user information input, user voice, and use state of the electronic apparatus 100, and identify the terminal device 200 based on the identified user.

The processor 120 may identify the user information stored in the storage based on the ID input by the user, and identify a smartphone of the user included in the user information.

The processor 120 may identify a user from the user image captured by a camera provided in the electronic apparatus 100. The processor 120 may identity a user from the user voice received by a microphone provided in the electronic apparatus 100. The processor 120 may store user-specific features, usage patterns of the electronic apparatus 100, etc. and analyze the use state of the user to identify a user.

The processor 120 may perform the operation for user identification based on occurrence of a password input event. However, the present disclosure is not limited thereto, and the processor 120 may identify a user using the above-described method even before the password input event occurs.

The processor 120 may identify one of a plurality of pieces of password information pre-stored in the storage based on the identified user. For example, the storage may store a plurality of pieces of user information from users 1 to 10, and password information for each user. The processor 120 may identify password information corresponding to the identified user and select a plurality of different words based on the identified password information.

The electronic apparatus 100 may further include a display, and when a user is identified, the processor 120 may display a UI to request confirmation of the terminal device 200 through the display, and when the confirmation input is received from the user, the processor 120 may transmit a plurality of words to the terminal device 200.

As described above, information for identifying a user and information on the terminal device 200 corresponding to the user may be pre-stored in the storage. However, the present disclosure is not limited thereto, but only the information for identifying a user may be pre-stored in the storage. In this case, the processor 120 may identify a user, and there is no information on the terminal device 200 corresponding to the identified user, and thus inputting the information on the terminal device 200 may be required.

The processor 120 may identify a user, and when there is no information on the terminal device 200 corresponding to the identified user, may perform the operation for identifying an external device near the electronic apparatus 100. The processor 120 may provide a list of the external devices identified near the electronic apparatus 100, and request a user to select a device to receive a plurality of words.

For example, the processor 120 may turn on a Bluetooth function, and provide a list of external devices sensed near the electronic apparatus 100. When a user selects one external device in the list, the processor 120 may transmit a plurality of words to the selected external device. When the user does not select an external device on the list, the processor 120 may request a user to input the terminal device 200 to receive a plurality of words, or guide that there is no information on the terminal device 200. The user may input information to the terminal device 200 by inputting a user's smartphone number.

The storage may store information on the plurality of terminal device 200 for one user, and the processor 120, based on the plurality of terminal devices 200 corresponding to the identified user being identified, may determine the terminal device 200 to which a plurality of words are transmitted based on the type of terminal device 200.

For example, and without limitation, the processor 120, based on a tablet PC and a smartphone being identified corresponding to the identified user, may transmit a plurality of words to the smartphone.

The processor 120, based on a plurality of terminal device 200 of the same type corresponding to the identified user being identified, may determine the terminal device 200 to transmit a plurality of words based on the display size.

For example, when smartphone 1 and smartphone 2 are identified corresponding to the identified user, the processor 120 may transit a plurality of words to smartphone 1 having a smaller sized display.

The processor 120 may determine a plurality of words based on the identified user. For example, when the password stored in the storage is "abc", and the identified user is a child, the processor 120 may select a plurality of different words respectively corresponding to alphabets. When the password stored in the storage is "abc", and the identified user is an adult, the processor 120 may select a plurality of different words respectively corresponding to alphabet, digit, and symbol.

However, in the case where the password stored in the storage includes alphabet, digit, and symbol such as "abc123*", even when the identified user is a child, the processor 120 may select a plurality of different words respectively corresponding to the alphabet, digit, and symbol.

The processor 120 may determine a plurality of characters based on the terminal device 200 corresponding to the identified user. For example, the processor 120, when the password stored in the storage is "abc", and the identified terminal device 200 is a smartphone having a small sized display, may select a plurality of different words respectively corresponding to alphabets. The processor 120, when the password stored in the storage is "abc", and the identified terminal device 200 is a tablet PC having a large sized display, may select a plurality of different words respectively corresponding to alphabet, digit, and symbol.

When the password stored in the storage includes alphabet, digit, and symbol such as "abc123*", although the identified terminal device 200 is a smartphone having a small sized display, the processor 120 may select a plurality of different words respectively corresponding to alphabet, digit, and symbol.

It has been described that the processor 120 transmits the plurality of selected words to the terminal device 200. Hereinafter, the operation of the processor 120 will be described when a plurality of words are transmitted to the terminal device 200, and then a user voice is received. For ease of explanation, it will be assumed that the processor 120 transmits dove, guide, lady, girl, boy, go, soft, code, suit and bird respectively corresponding to characters 0 to 9 to the terminal device 200.

The processor 120, based on a user voice including at least one of a plurality of words being received, may perform password authentication based on the character corresponding to at least one word. The processor 120 may perform password authentication based on the character corresponding to at least one word matching password information.

For example, when the password "75" is stored in the storage, and after dove, guide, lady, girl, boy, go, soft, code, suit and bird are transmitted to the terminal device 200 and the user utters code and go, the processor 120 may identify characters 7 and 5 respectively corresponding to code and go, compare the characters with the password information stored in the storage, and perform authentication.

The processor 120, based on a user voice including a first word and a second word among a plurality of words being received, may combine a first character corresponding to a first word with a second character corresponding to a second word based on the reception order of the first word and the second word, and if the string of the combined characters matches the password information, may perform password authentication.

For example, according to the above-described embodiment, the user utters go and code, the processor 120 may identify 5 and 7 in the order of utterance of the user, refuse authentication, or request re-authentication.

The processor 120 may perform password authentication by combining a first character with a second character based on a difference between a reception time of the first word and a reception time of the second word being within a predetermined time, and perform password authentication with each of the first character and the second character based on the difference between the reception time of the first word and the reception time of the second word exceeding the predetermined time.

For example, the processor 120, when a difference between a reception time of code and a reception time of go is within, for example, and without limitation, 3 seconds, may identify 7 and 5, compare 7 and 5 with password information, and perform password authentication. The processor 120, when the difference between the reception time of code and the reception time of go exceeds, for example, and without limitation, 3 seconds, may compare 7 with the authentication information to reject authentication, and compare 5 with the authentication information to reject authentication The electronic apparatus 100 may further include a display, and the processor 120 may display a UI to which a password is input through the display according to a password input event, and based on a user voice being received, input at least one word corresponding to the received user voice to the UI.

According to an embodiment as described above, the processor 120 may display the UI to which the password is input through the display, and based on a user voice uttering code and go being received, input code and go to the UI for displaying.

However, the present disclosure is not limited thereto, the processor 120 may input the character "*" to the UI for displaying every time when one word is received and the character corresponding to the received word is identified. The user may determine whether the word is input based on the character "*" input to the UI. However, the character "*" is only an example embodiment, and any character could be used if indicating that a word is being input.

The processor 120, based on occurrence of a password input event, may identify whether the character corresponding to at least one word input to the UI matches password information, and when the character corresponding to at least one word matches the password information, perform password authentication.

For example, the processor 120 may identify whether the string of the identified characters matches password information every time when one word is received and the character corresponding to the received word is identified. When the code is received and 7 is identified, the processor 120 may identify whether the identified 7 matches the password information. In this case, the processor 120 may reject authentication after a predetermined time passes after the code is received. When go is received and 5 is identified within a predetermined time after the code is received, the processor 120 may identify whether the identified 7 and 5 match the password information.

The predetermined event may refer, for example, to a predetermined period of time passing after completion of reception of the user's voice. According to the above-described embodiment, when code and go are received and two seconds have elapsed while no additional user voice is received, the processor 120 may identify (determine) whether 7 and 5 corresponding to code and go match the password information.

The processor 120 may identify (determine) whether the character corresponding to at least one word input to the UI according to the input of a predetermined user voice matches password information. According to the above-described embodiment, when a user utters code and go, and additionally utters "confirm", the processor 120 may identify 7 and 5 corresponding to code and go, and identify whether 7 and 5 identified according to the utterance of "confirm" match password information. The "confirm" may be excluded from the word pool for selecting a plurality of words.

When the electronic apparatus 100 is an apparatus having an input means (circuitry) such as a computer, a predetermined event may be an operation for inputting an enter key.

The processor 120 may store a plurality of words transmitted to the terminal device 200 and a plurality of characters respectively corresponding to the plurality of words in a storage for a predetermined period of time, and after the predetermined period of time passes, delete the plurality of words and the plurality of characters corresponding to the plurality of words.

According to the above-described embodiment, the processor 120 may store dove, guide, lady, girl, boy, go, soft, code, suit and bird transmitted to the terminal device 200, and characters 0 to 9 respectively corresponding to the plurality of transmitted words in the storage, and if password authentication is not performed within, for example, and without limitation, 60 seconds, may delete dove, guide, lady, girl, boy, go, soft, code, suit and bird, and characters of 0 to 9 respectively corresponding to the plurality of transmitted words from the storage.

As described above, the processor 120 may perform password authentication.

Figure 2B:
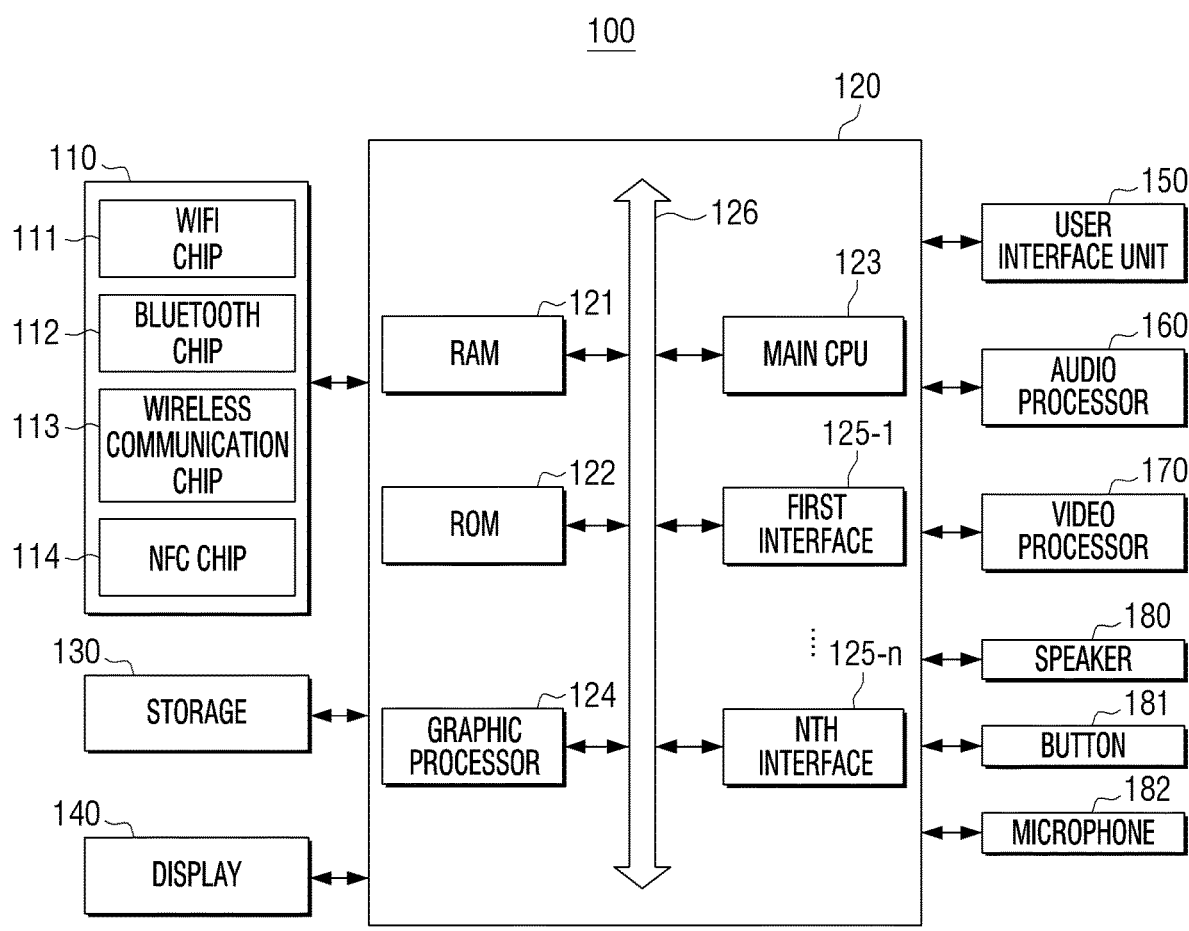
FIG. 2B is a block diagram illustrating an example configuration of an electronic apparatus according to an example embodiment.

FIG. 2B is a block diagram illustrating an example configuration of an electronic apparatus according to an example embodiment. An electronic apparatus 100 may include a communicator (e.g., including communication circuitry) 110 and a processor (e.g., including processing circuitry) 120. In addition, referring to FIG. 2B, the electronic apparatus 100 may include a storage 130, a display 140, a user interface unit (e.g., including user interface circuitry) 150, an audio processor (e.g., including audio processing circuitry) 160, a video processor (e.g., including video processing circuitry) 170, a speaker 180, a button 181, and a microphone 182. A detailed description of the elements of FIG. 2B that are redundant to those shown in FIG. 2A, may not be repeated here.

The processor 120 may include various processing circuitry and control the overall operation of the electronic apparatus 100 using, for example, and without limitation, various programs stored in the storage 130.

The processor 120 may include a RAM 121, a ROM 122, a CPU 133, a graphic processing unit (GPU) 134, first to nth interfaces 125-1 to 125-n, and a bus 126. The RAM 121, the ROM 122, the CPU 123, the graphic processing unit (GPU) 124, and the first to nth interfaces 125-1 to 125-n may be connected to one another via the bus 126.

The first to nth interfaces 125-1 to 125-n may be connected to various constituent elements described above. One of the first to nth interfaces 125-1 to 125-n may be a network interface connected to an external device through a network.

The CPU 123 may access the storage 130 and perform booting by using the O/S stored in the storage 130. The CPU 123 may perform various operations by using various programs, contents, data, etc. stored in the storage 130.

A command set, etc. for system booting may be stored in the ROM 122. When a turn-on command is input and power is supplied, the CPU 123 may copy the O/S stored in the storage 130 to the RAM 121 according to the command stored in the ROM 122, execute the O/S and perform system booting. When the booting is completed, the CPU 123 may copy various application programs stored in the storage 130 to the RAM 121, execute the application programs copied to the RAM 131, and perform various operations.

The graphic processor 124 may generate a screen including various objects such as icons, images, texts, etc. by using a calculation unit (not shown) and a rendering unit (not shown). The calculation unit (not shown) may calculate attribute values such as coordinate values, shapes, sizes, colors, etc. of the objects according to the layout of the screen by using the received control command. The rendering unit (not shown) may generate screens of various layouts including objects based on the attribute values calculated by the calculation unit (not shown). The screen generated by the rendering unit (not shown) may be displayed in a display region of the display 140.

The operation of the processor 120 may be performed by the program stored in the storage 130.

The storage 130 may store various data such as, for example, and without limitation, an operating system (O/S) software module for driving the electronic apparatus 100, a user information module, a password authentication module, etc.

The communicator 110 may include various communication circuitry and perform communication with various types of external devices using various types of communication methods. The communicator 110 may include various communication chips including various communication circuitry, such as, for example, and without limitation, a Wi-Fi chip 111, a Bluetooth chip 112, a wireless communication chip 113, an NFC chip 114, or the like. The processor 120 may perform communication with various types of external devices using the communicator 110.

The Wi-Fi chip 111 or the Bluetooth chip 112 may perform communication using a Wi-Fi method, and a Bluetooth method, respectively. When the Wi-Fi chip 111 or the Bluetooth chip 112 is used, various connectivity information such as an SSID and a session key may be transmitted and received first, communication connection may be established based on the connectivity information, and various information may be transmitted and received based thereon. The wireless communication chip 113 refers to a chip that performs communication according to various communication standards such as IEEE, ZigBee, 3rd Generation (3G), 3rd Generation Partnership Project (3GPP), Long Term Evolution (LTE), etc. The NFC chip 114 refers to a chip operating in an NFC (Near Field Communication) mode using 13.56 MHz band among various RF-ID frequency bands such as 135 kHz, 13.56 MHz, 433 MHz, 860 to 960 MHz and 2.45 GHz.

The communicator 110 may further include a wired communication interface including various interface circuitry and/or ports, such as, for example, and without limitation, HDMI, MHL, USB, DP, thunderbolt, RGB, D-SUB, DVI, etc. The processor 120 may be connected to a display device through a wired communication interface of the communicator 110. The processor 120 may transmit a UI for performing password authentication to a display device through a wired communication interface.

The display 140 may be implemented as various types of displays such as, for example, and without limitation, a Liquid Crystal Display (LCD), an Organic Light Emitting Diodes (OLED) display, a Plasma Display Panel (PDP), and the like. The display 140 may also include a driving circuit, a backlight unit, etc., which may be implemented in the form of an a-si TFT, a low temperature poly silicon (LTPS) TFT, an organic TFT (OTFT), etc. Meanwhile, the display 140 may be implemented as a touch screen in combination with a touch sensor.

The user interface unit 150 may include various user interface circuitry and receive various user interaction. The user interface unit 150 may be embodied as various types according to an embodiment of the electronic apparatus 100. For example, the user interface unit 150 may include, for example, and without limitation, buttons provided in the electronic apparatus 100, a microphone receiving a user voice, a camera for sensing user motion, etc. When the electronic apparatus 100 is embodied as a touch-based terminal device, the user interface unit 150 may include a touch screen having a mutual layer structure with a touch pad. The user interface unit 150 may be used as the display 150.

The audio processor 160 may include various audio processing circuitry and be configured to perform processing of audio data. The audio processor 160 may perform various processing on audio data such as decoding, amplification, noise filtering, etc.

The video processor 170 may include various video processing circuitry and be configured to perform processing of video data. The video processor 170 may perform various image processes such as decoding, scaling, noise filtering, frame rate conversion, resolution conversion, etc. of video data.

The speaker 180 may be configured to output various alarming sounds or voice messages in addition to audio data processed by the audio processor 160.

The button 181 may include various types of buttons such as a mechanical button, a touch pad, a whirl, etc. provided in a random area such as a front surface unit, a side surface unit, and a rear surface unit of the outside of the body.

The microphone 182 may be configured to receive user voices and other sounds and convert the voices or sounds into audio data.

Accordingly, the processor 120 may perform password authentication through a voice while maintaining security.

Hereinafter, the operation of the electronic apparatus 100 will be described in detail with reference to the drawings.

Figure 3A:
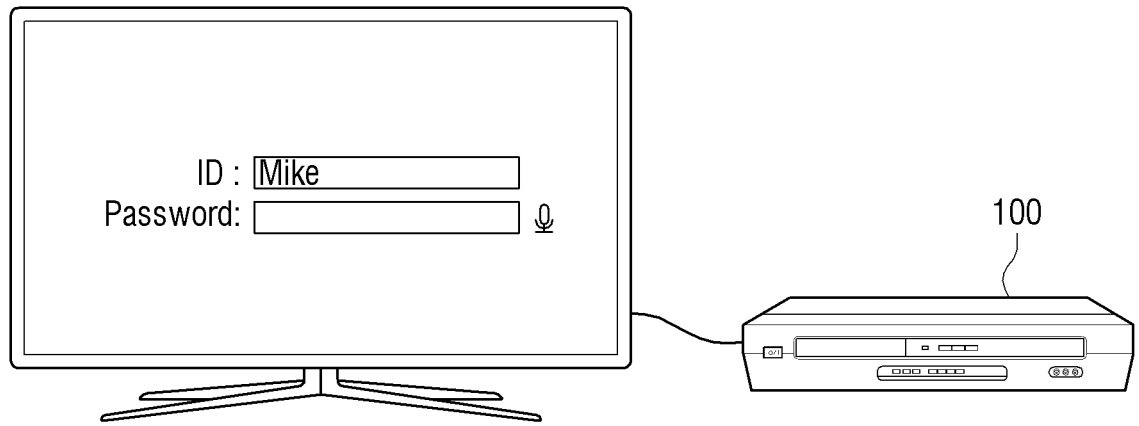
Figure 3C:
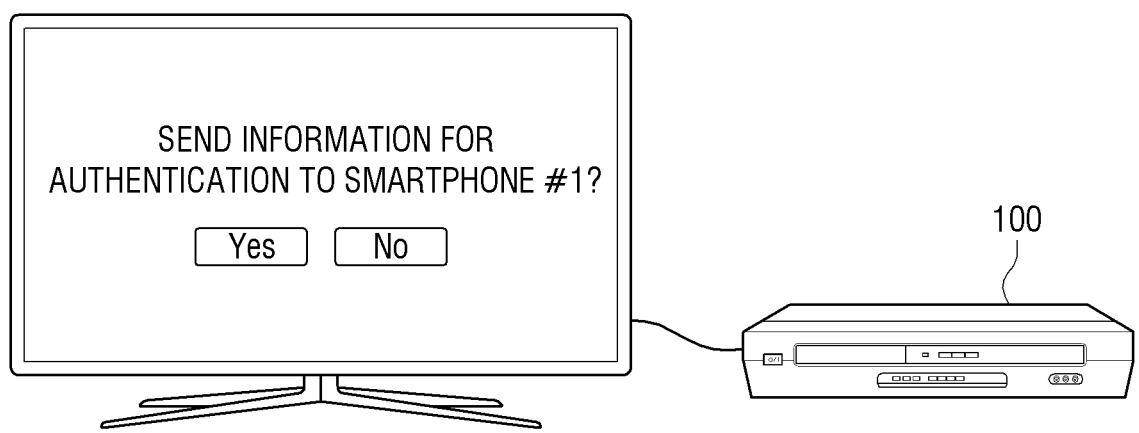

FIGS. 3A, 3B and 3C are 3C are diagrams illustrating an example of a method for transmitting a plurality of words to a terminal device 200 according to an example embodiment.

Referring to FIG. 3A, the electronic apparatus 100 may be connected to a display apparatus in a wired manner. However, the present disclosure is not limited thereto, and the electronic apparatus 100 may be connected to a display device in a wireless manner.

The electronic apparatus 100 may provide contents to a display device, and the display device may display contents. When a password input event occurs, such as payment for purchasing goods during display of contents, the processor 120 of the electronic apparatus 100 may perform an operation for identifying a user.

For example, the processor 120 may identify a user based on at least one of, for example, and without limitation, user face recognition, user information input, user voice, use state of the electronic apparatus, or the like. FIG. 3A illustrates a state of inputting an ID such as MIKE, and the processor 120 may identify a user based on user's information input.

FIG. 3B is a table illustrating an example of the information stored in the storage 130, and the processor 120 may identify the password information "abc" and the terminal device 200 "smartphone #1" corresponding to the Mike from the information stored in the storage 130.

The processor 120 may select a plurality of different words based on the characters included in the password information. For example, the processor 120 may select the plurality of different words respectively corresponding to alphabets.

The processor 120 may use a rule-based random selection method when selecting a plurality of different words. However, the present disclosure is not limited thereto. The processor 120 may use the random selection method to which a rule is not applied when selecting the plurality of different words. The random selection method is a well-known technique, and thus the detailed description will be omitted.

The processor 120 may transmit the plurality of selected words to the terminal device 200. The processor 120 may transmit the plurality of selected words to "smartphone #1" corresponding to Mike.

The processor 120 may be subjected to a verification procedure for transmitting a plurality of words. For example, the processor 120, referring to FIG. 3C, may transmit a screen "send information on authentication to smartphone #1?" to the display device. The display device may display the phrase, and based on a confirmation input being received, may transmit the signal corresponding to the confirmation input to the electronic apparatus 100. The processor 120, based on a signal corresponding to the confirmation input being received from the display device, may transmit the plurality of selected words to smartphone #1.

Figure 4A:
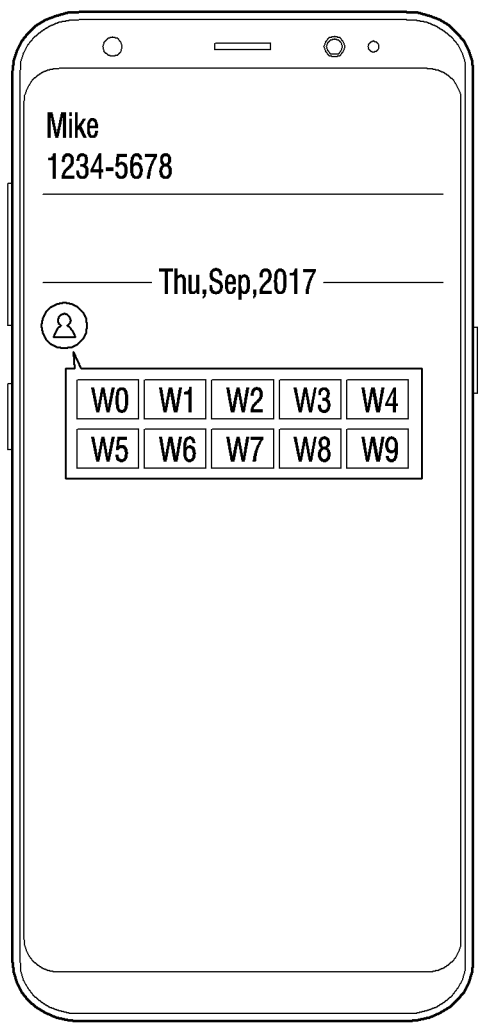
FIG. 4A is a diagram illustrating an example of a method for displaying a plurality of words by a terminal device according to an example embodiment.

FIG. 4A is a diagram illustrating an example of a method for displaying a plurality of words by a terminal device 200 according to an example embodiment.

The terminal device 200 may receive a plurality of words from the electronic apparatus 100. The electronic apparatus 100 may transmit the plurality of words to the terminal device 200 in a wireless manner. However, the present disclosure is not limited thereto, but the electronic apparatus 100 may transmit a plurality of words to the terminal device 200 in a wired manner.

Referring to FIG. 4A, the terminal device 200 may display the plurality of received words. For example, when receiving a plurality of words W0 to W9 respectively corresponding to characters 0 to 9, the terminal device 200 may display W0 to W9.

Figure 4B:
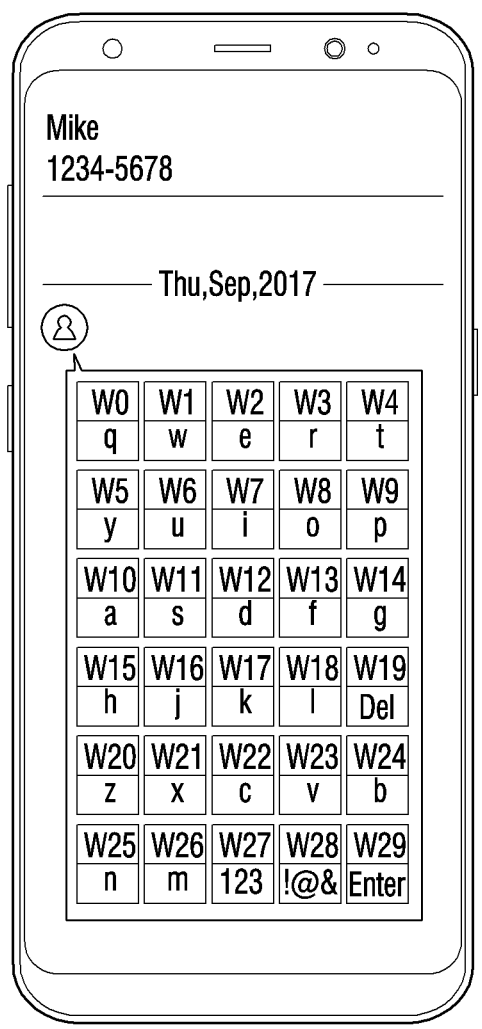
FIG. 4B is a diagram illustrating another example of a method for displaying a plurality of words by a terminal device according to an example embodiment.

FIG. 4B is a diagram illustrating another example of a method for displaying a plurality of words by a terminal device 200 according to an example embodiment.

The electronic apparatus 100 may transmit a plurality of selected words and the characters respectively corresponding to the plurality of words to the terminal device 200. The terminal device 200, referring to FIG. 4B, may match the plurality of words with the characters respectively corresponding to the plurality of words for displaying.

FIGS. 4A and 4B illustrate that the terminal device 200 directly displays the plurality of received words, but the terminal device 200 may further perform an operation for identifying a user before displaying the plurality of received words.

For example, the terminal device 200 may identify a user through, for example, and without limitation, at least one of face recognition, fingerprint recognition, iris recognition, voice recognition of a user, input information of a user based on a plurality of words being received, or the like. When the identified user is registered to the terminal device 200, the terminal device 200 may display a plurality of words.

The electronic apparatus 100 may transmit user information together with the plurality of words to the terminal device 200. The terminal device 200, based on the identified user matching the received information on the user, may display a plurality of words.

Figure 5A:
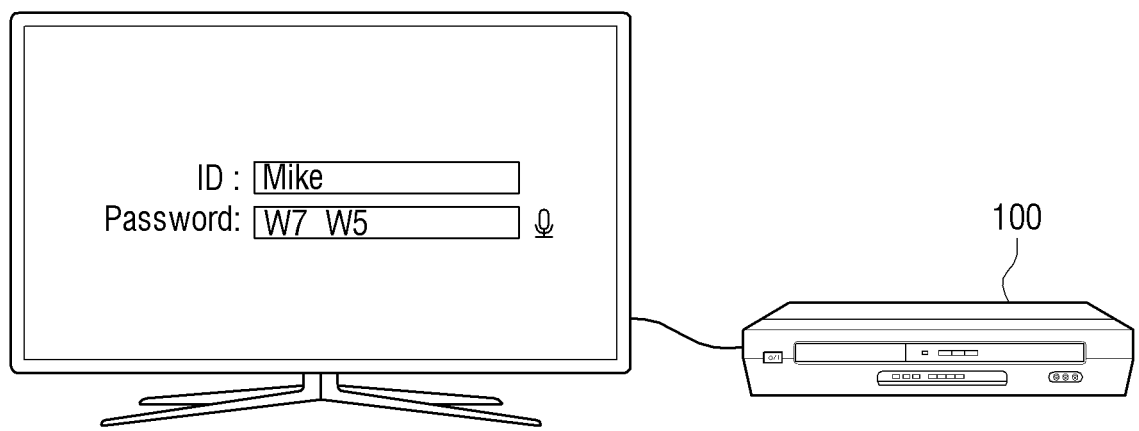
FIG. 5A is a diagram illustrating an example of an operation of an electronic apparatus according to a user voice according to an example embodiment.

FIG. 5A is a diagram illustrating an example operation of an electronic apparatus 100 according to a user voice according to an example embodiment.

Referring to FIG. 5A, the processor 120 may receive a user voice. The processor 120 may directly receive a user voice through a microphone 182 provided in the electronic apparatus 100. The processor 120 may receive a user voice from the display device.

The processor 120 may identify at least one word from the received user voice and transmit the identified word to the display device. The display device may display the received word.

The processor 120 may include the identified word in the UI to which the password is input, and transmit the UI to the display device. In this case, the display device may display the received UI as it is.

Figure 5B:
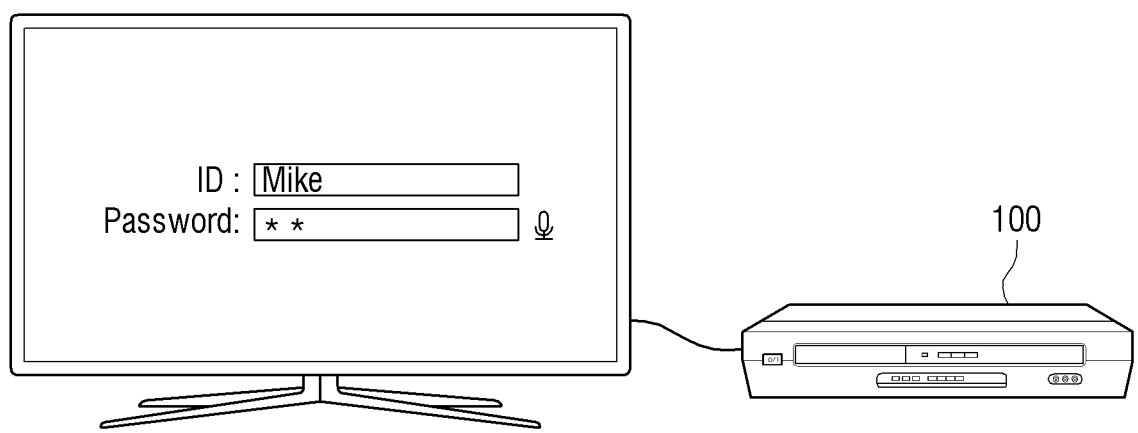
FIG. 5B is a diagram illustrating another example of an operation of an electronic apparatus according to a user voice according to an example embodiment.

FIG. 5B is a diagram illustrating another example of an operation of an electronic apparatus 100 according to a user voice according to an example embodiment.

The processor 120 may identify at least one word from the received user voice, and transmit the number of identified words to the display device. In this case, the display device may display "*" to password based on the number of identified words.

The processor 120 may include "*" corresponding to the number of identified words in the UI to which the password is input and transmit the UI to the display device. In this case, the display device may display the received UI as it is.

FIGS. 3A, 3B and 3C, and FIGS. 5A and 5B illustrate that the electronic apparatus 100 and the display device are separate. However, the present disclosure is not limited thereto. For example, the electronic apparatus 100 and the display device may be integrally embodied. Data transmission/reception operation between the electronic apparatus 100 and the display device described in FIGS. 3A, 3B and 3C and 5A and 5B may be data transmission/reception operation between the processor 120 and the display 140 of the electronic apparatus 100.

Referring to FIGS. 3A, 3B and 3C, and 5A and 5B, the electronic apparatus 100 may transmit a screen to a display device. When the electronic apparatus 100 and the display device are integrally embodied, the processor 120 of the electronic apparatus 100 may display a screen through the display 140. The processor 120 may directly control the display 140.

Figure 6:
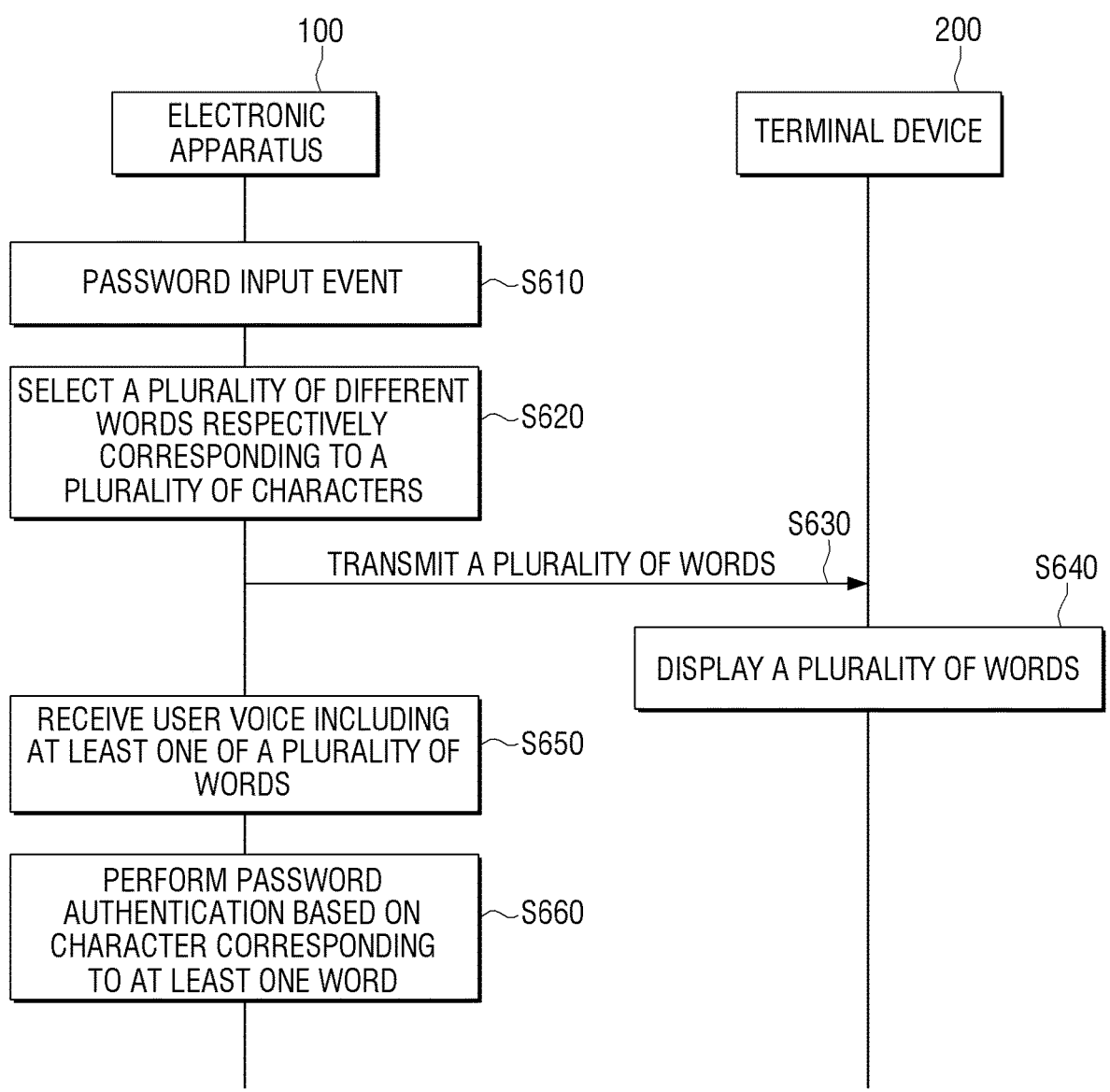
FIG. 6 is a sequence diagram illustrating an example operation of an electronic system according to an example embodiment.

FIG. 6 is a sequence diagram illustrating an example operation of an electronic system according to an example embodiment. Referring to FIG. 6, an electronic system may include an electronic apparatus 100 and a terminal device 200.

The electronic apparatus 100 may sense (detect) password input event occurrence at step S610. The electronic apparatus 100 may select different words respectively corresponding to a plurality of characters at step S620. The electronic apparatus 100 may transmit a plurality of words to the terminal device 200 at step S630.

The terminal device 200 may receive a plurality of words from the electronic apparatus 100 and display the plurality of received words at step S640.

The electronic apparatus 100 may receive a user voice including at least one of a plurality of words at step S650. The electronic apparatus 100 may directly receive a user voice or may receive a user voice from an external device including the terminal device 200.

The electronic apparatus 100 may perform password authentication based on the character corresponding to at least one word at step S660.

Figure 7:
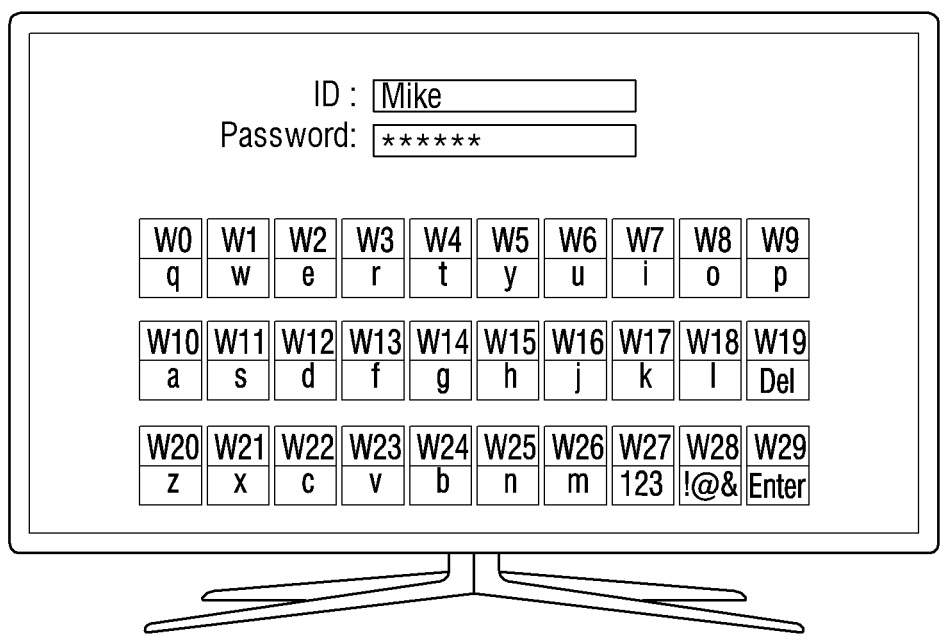
FIG. 7 is a diagram illustrating an example password authentication method according to an example embodiment.

FIG. 7 is a diagram illustrating an example of a password authentication method according to an example embodiment.

Referring to FIG. 7, a password authentication method may be performed by one display device. For example, the display device, based on occurrence of a password input event, may select a plurality of different words respectively corresponding to a plurality of characters, and display the plurality of selected words through the display. The display device, based on a user voice including at least one of the plurality of words being received, may perform password authentication based on the character corresponding to at least one word.

Figure 8:
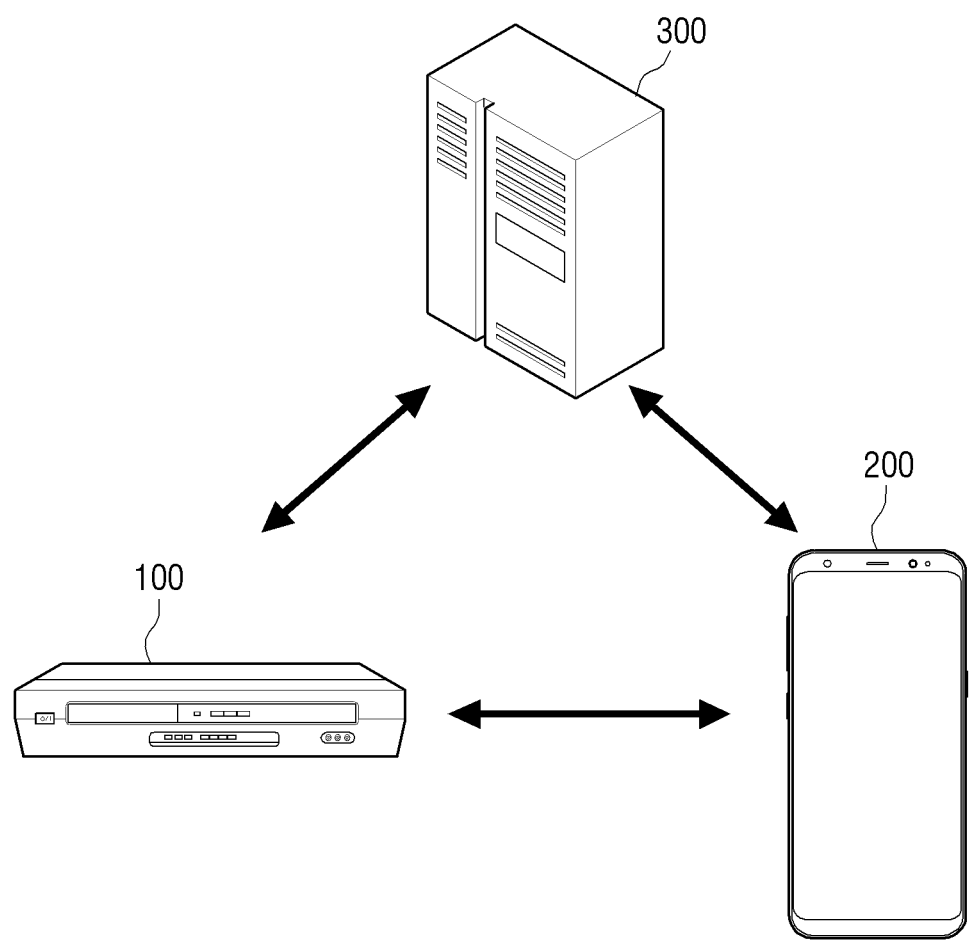
FIG. 8 is a diagram illustrating another example embodiment of a password authentication method according to an example embodiment.

FIG. 8 is a diagram illustrating another example of a password authentication method according to an example embodiment.

Referring to FIG. 8, an electronic system may include an electronic apparatus 100, a terminal device 200, and a server, for example, a voice recognition server 300.

Based on a occurrence of a password input event, the electronic apparatus 100 may select a plurality of different words respectively corresponding to a plurality of characters, and transmit the plurality of selected words to the terminal device 200.

The terminal device 200 may display the plurality of received words.

The electronic apparatus 100 may receive a user voice including at least one of a plurality of words. The electronic apparatus 100 may directly receive a user voice. The analog voice signal received through the microphone provided in the electronic apparatus 100 may be digitized and transmitted to the processor 120 of the electronic apparatus 100.

The electronic apparatus 100 may receive a user voice from an external device. For example, the electronic apparatus 100 may receive a user voice from an external device such as a remote control device. The external device may receive an analog voice signal through a microphone provided in the external device, digitize the received analog voice signal, and transmit the digitized voice signal to the electronic apparatus 100 through Bluetooth, etc.

The electronic apparatus 100 may transmit the received user voice to the voice recognition server 300. The voice recognition server 300 may convert the received user voice into text, and transmit the text to the electronic apparatus 100. The electronic apparatus 100 may perform password authentication based on the received text.

The electronic apparatus 100, based on occurrence of a password input event, may transmit the occurrence of the password input event to the voice recognition server 300. The voice recognition server 300 may select a plurality of different words respectively corresponding to a plurality of characters and transmit the plurality of selected words to the terminal device 200. The voice recognition server 300 may include a storage for storing password information, user information, etc.

The electronic apparatus 100, based on a user voice including at least one of a plurality of words being received, may transmit the received user voice to the voice recognition server 300.

The voice recognition server 300 may convert the received user voice into text and perform password authentication based on the text. The voice recognition server 300 may identify the character based on the text and perform password authentication when the identified character matches the password information. The voice recognition server 300 may transmit the password authentication performance result to the electronic apparatus 100.

As described above, only one voice recognition server 300 is illustrated, but the present disclosure is not limited thereto. For example, the voice recognition server 300 may include a first server for converting a user voice into text and transmitting the text to the electronic apparatus 100, a second server, or the second server for performing other operations. The second server may, for example, select a plurality of words according to the password input event occurrence, transmit the plurality of selected words to the terminal device 200, and receive a user voice converted into text from the first server or the electronic apparatus 100 to perform password authentication.

The communication standard of the electronic apparatus 100 and the terminal device 200 may be different from that of the electronic apparatus 100 and the voice recognition server 300. For example, the electronic apparatus 100 may perform communication with the terminal device 200 through Bluetooth, and perform communication with the voice recognition server 300 through Ethernet modem.

However, the present disclosure is not limited thereto, and the electronic apparatus 100 may perform communication with the terminal device 200 and the voice recognition server 300 using the same communication standard.

Figure 9:
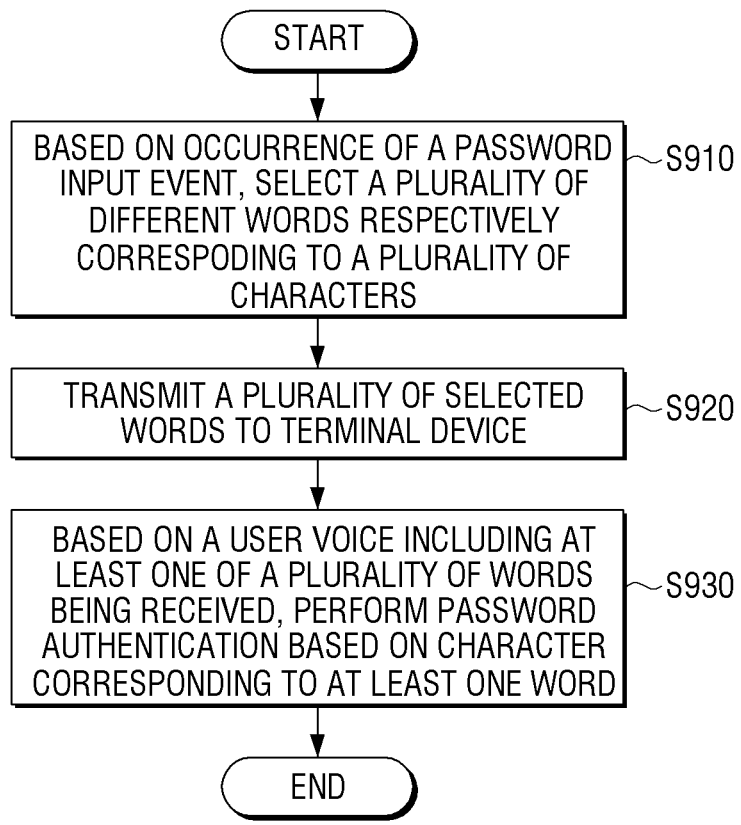
FIG. 9 is a flowchart illustrating an example controlling method of an electronic apparatus according to an example embodiment.

FIG. 9 is a flowchart an example method of controlling an electronic apparatus according to an example embodiment.

When a password input event occurs, a plurality of different words respectively corresponding to a plurality of characters may be selected at step S910. The plurality of selected words may be transmitted to a terminal device at step S920. Based on a user voice including at least one of the plurality of words being received, password authentication may be performed based on the character corresponding to at least one word at step S930.

Performing password authentication S930 may include, for example, performing password authentication when a character corresponding to at least one word matches pre-stored password information including at least one character.

Performing password authentication S930 may include, for example, combining a first character corresponding to a first word with a second character corresponding to a second word based on the reception order of the first word and the second word based on a user voice including the first word and the second word among the plurality of words being received, and performing password authentication based on the string of the combined characters matching password information.

Performing password authentication S930 may include, for example, performing password authentication by combining the first character with the second character based on the difference between the reception time of the first word and the reception time of the second word being within the predetermined period of time, and performing password authentication with each of the first character and the second character based on the difference between the reception time of the first word and the reception time of the second word exceeding the predetermined period of time.

Performing password authentication S930 may further include, for example, displaying an input UI to which a password is input according to the password input event, and based on a user voice being received, inputting at least one word corresponding to the received user voice to the UI.

Performing password authentication S930 may further include, for example, based on occurrence of a password input event, identifying whether the character corresponding to at least one word matches password information, and based on the character corresponding to at least one word matching password information, performing password authentication.

Selecting S910 may include, for example, identifying the character type necessary for password authentication based on the password information, and selecting a plurality of different words respectively corresponding to a plurality of characters in the character type.

The plurality of characters may include, for example, at least one of alphabet, digit, symbols, Korean, and Chinese, and transmitting S910 may include matching a plurality of characters with a plurality of words and transmit the matched characters and words to the terminal device.

According to various example embodiments of the present disclosure, the electronic apparatus may improve usability by performing password authentication through a user voice, and provide the improved security performance by preventing and/or reducing leakage of a password.

Various example embodiments of the present disclosure may be embodied as software including commands stored in machine-readable storage media. The machine may be an apparatus that calls a command stored in a storage medium and is operable according to the called command, including an electronic apparatus in accordance with the disclosed example embodiments (e.g., an electronic apparatus). When the command is executed by a processor, the processor may perform the function corresponding to the command, either directly or under the control of the processor, using other components. The command may include code generated or executed by a compiler or an interpreter. The machine-readable storage medium may be provided in the form of a non-transitory computer readable storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g., PlayStore™). In the case of on-line distribution, at least a portion of the computer program product may be temporarily stored, or temporarily created, on a storage medium such as a manufacturer's server, a server of an application store, or a memory of a relay server.

The various embodiments described above may be implemented in a recording medium that can be read by a computer or a similar device using software, hardware, or any combination thereof. In some cases, embodiments described herein may be implemented by a processor itself. According to software implementation, embodiments such as the procedures and functions described herein may be implemented in separate software modules. According to some embodiments, software (e.g., the program) may contain one or more instructions that are stored in a machine (e.g., computer) readable storage medium (e.g., internal memory) or external memory. Each of the software modules may perform one or more of the functions and operations described herein.

The non-transitory computer readable medium refers to a medium that stores data semi-permanently and is readable by an apparatus. For example, the above-described various applications or programs may be stored in a non-transitory computer readable medium such as a compact disc (CD), a digital versatile disk (DVD), a hard disk, a Blu-ray disk, a universal serial bus (USB) memory stick, a memory card, a read only memory (ROM), or the like.

Each of the components (e.g., modules or programs) according to various example embodiments may include a single entity or a plurality of entities, and some subcomponents of the abovementioned subcomponents may be omitted, or other components may be further included in various embodiments. Some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although various example embodiments have been illustrated and described, it will be appreciated by those skilled in the art that changes may be made to these example embodiments without departing from the principles and spirit of the present disclosure. Accordingly, the scope of the present disclosure is not limited to the described example embodiments, but is defined, for example, by the appended claims as well as equivalents thereto.

What is claimed is:

1. An electronic apparatus, comprising:
a display;
a communicator comprising communication circuitry; and
a processor configured to:
identify a plurality of different words respectively corresponding to a plurality of characters based on at least a password input event being identified,
control the communicator to transmit the plurality of identified words to a terminal device, and receive data corresponding to a user voice input, received through the electronic apparatus and/or the terminal device, including at least one of the plurality of identified words,
perform a function corresponding to a password authentication based on at least a character corresponding to the at least one of the plurality of identified words included in the user voice input,
control the display to display a User Interface (UI) to which a password is input based on the password input event, and
provide at least one word corresponding to the received user voice input to the UI based on at least the user voice input being input.

2. The electronic apparatus as claimed in claim 1, further comprising:
a storage configured to store password information including at least one character,
wherein the processor is further configured to cause the electronic apparatus to perform the function corresponding to the password authentication based on the character corresponding to the at least one word included in the user voice input matching the password information.

3. The electronic apparatus as claimed in claim 2, wherein the processor is further configured to cause the electronic apparatus to:
combine, based on the user voice input including a first word and a second word among the plurality of words being received, a first character corresponding to the first word with a second character corresponding to the second word based on a reception order of the first word and the second word, and
perform the function corresponding to the password authentication based on a string of the combined first and second characters matching the password information.

4. The electronic apparatus as claimed in claim 3, wherein the processor is further configured to cause the electronic apparatus to:
perform the function corresponding to the password authentication by combining the first character with the second character based on a difference between a reception time of the first word and a reception time of the second word being within a predetermined period of time, and
perform the function corresponding to the password authentication with each of the first character and the second character based on the difference between the reception time of the first word and the reception time of the second word exceeding the predetermined period of time.

5. The electronic apparatus as claimed in claim 1, wherein the processor is further configured to cause the electronic apparatus to:

identify whether the character corresponding to the at least one word input to the UI matches password information based on a predetermined event being identified, and perform the function corresponding to the password authentication based on the character corresponding to the at least one word matching the password information.

6. The electronic apparatus as claimed in claim 2, wherein the processor is further configured to cause the electronic apparatus to:

select a character type necessary for the password authentication based on the password information, and select a plurality of different words respectively corresponding to a plurality of characters in the character type.

7. The electronic apparatus as claimed in claim 1, wherein the plurality of characters include at least one of: alphabet, digit, symbol, Korean, and Chinese, and wherein the processor is further configured to match the plurality of characters with the plurality of words and to cause the electronic apparatus to transmit the matched plurality of characters and words to the terminal device.

8. The electronic apparatus as claimed in claim 1, wherein the processor is further configured to cause the electronic apparatus to:

identify a user based on at least one of: face recognition of the user, input of information on the user, a voice of the user, and a use state of the electronic apparatus, and identify the terminal device based on the identified user.

9. An electronic apparatus comprising:
a display;
a communicator comprising communication circuitry; and
a processor configured to:
identify a plurality of different words respectively corresponding to a plurality of characters based on a password input event being identified;
identify a user based on at least one of: face recognition of the user, input of information on the user, a voice of the user, and a use state of the electronic apparatus;
identify a terminal device based on at least the identified user;
control the display to display a User Interface (UI) configured to request confirmation of the terminal device based on the user being identified;
control the communicator to transmit the plurality of words to the terminal device based on a confirmation input of the user being received, and receive data corresponding to a user voice input, received through the electronic apparatus and/or the terminal device, including at least one of the plurality of identified words; and
perform a function corresponding to a password authentication based on a character corresponding to the at least one of the plurality of identified words included in the user voice input.

10. The electronic apparatus as claimed in claim 1, wherein the electronic apparatus is configured to receive the user voice input through a microphone provided in the electronic apparatus and/or receive the data about the user voice input from an external voice recognition server.

11. An electronic system, comprising:
a terminal device; and
an electronic apparatus configured to: identify a plurality of different words respectively corresponding to a plurality of characters based on a password input event being identified, identify a user based on at least one of: face recognition of the user, input of information on the user, a voice of the user, and a use state of the electronic apparatus, identify the terminal device based on the identified user, display a User Interface (UI) configured to request confirmation of the terminal device through a display of the electronic apparatus based at least on the user being identified, and transmit the plurality of identified words to the terminal device based at least on a confirmation input of the user being received, wherein the terminal device is configured to display the plurality of identified words based on the plurality of identified words being received from the electronic apparatus, and wherein the electronic apparatus is configured to receive data corresponding to a user voice input received through the electronic apparatus and/or the terminal device, including at least one of the plurality of identified words, and perform a function corresponding to a password authentication based on a character corresponding to the at least one of the plurality of identified words included in the user voice input.

12. A method for controlling an electronic apparatus, the method comprising:

identifying a plurality of different words respectively corresponding to a plurality of characters based on a password input event being identified;

transmitting the plurality of identified words to a terminal device and receiving data corresponding to a user voice input, received through the electronic apparatus or the terminal device, including at least one of the plurality of identified words;

performing a function corresponding to a password authentication based on a character corresponding to the at least one of the plurality of identified words included in the user voice input;

displaying a User Interface (UI) configured to receive a password based at least on the password input event; and based at least on the user voice input being received, providing at least one word corresponding to the received user voice input to the UI.

13. The method as claimed in claim 12, wherein the performing comprises performing the function corresponding to the password authentication based on the character corresponding to the at least one word included in the user voice input matching pre-stored password information including at least one character.

14. The method as claimed in claim 13, wherein the performing comprises:

combining, based on the user voice input including a first word and a second word of the plurality of words being received, a first character corresponding to the first word with a second character corresponding to the second word based on a reception order of the first word and the second word, and performing the function corresponding to the password authentication based on a string of the combined first and second characters matching the password information.

15. The method as claimed in claim 14, wherein the performing comprises:

performing the function corresponding to the password authentication by combining the first character with the second character based on a difference between a reception time of the first word and a reception time of the second word being within a predetermined period of time, and performing the function corresponding to the password authentication with each of the first character and the second character based on the difference between the reception time of the first word and the reception time of the second word exceeding the predetermined period of time.

16. The method as claimed in claim 12, wherein the performing comprises:

identifying whether a character corresponding to the at least one word input to the UI matches password information based on a predetermined event being identified, and performing the function corresponding to the password authentication based on the character corresponding to the at least one word matching the password information.

17. The method as claimed in claim 13, wherein the identifying comprises:

identifying a character type necessary for the password authentication based on the password information, and identifying a plurality of different words respectively corresponding to a plurality of characters in the character type.

18. The method as claimed in claim 12, wherein the plurality of characters include at least one of: alphabet, digit, symbol, Korean, and Chinese, and wherein the transmitting comprises matching the plurality of characters with the plurality of words and transmitting the matched plurality of characters and words to the terminal device.

* * * * *